(12) United States Patent
Paul et al.

(10) Patent No.: US 8,122,455 B2
(45) Date of Patent: Feb. 21, 2012

(54) BALANCING OF LOAD IN A NETWORK PROCESSOR

(75) Inventors: Manoj Paul, Bangalore (IN); Sanjay Kumar, Bangalore (IN); Udaya Shankara, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 1272 days.

(21) Appl. No.: 11/768,353

(22) Filed: Jun. 26, 2007

(65) Prior Publication Data

US 2009/0007133 A1    Jan. 1, 2009

(51) Int. Cl.
*G06F 9/46* (2006.01)
*G06F 15/173* (2006.01)

(52) U.S. Cl. ........ 718/105; 718/100; 718/101; 718/102; 718/103; 718/104

(58) Field of Classification Search .................. None
See application file for complete search history.

(56) References Cited

U.S. PATENT DOCUMENTS 7,117,269 B2 * 10/2006 Lu et al. ................. 709/238
2007/0061808 A1 * 3/2007 Kumar et al. ............. 718/102

* cited by examiner

*Primary Examiner* — Kenneth Tang
(74) *Attorney, Agent, or Firm* — Blakely, Sokoloff, Taylor & Zafman LLP

(57) ABSTRACT

According to an aspect of the present invention, a scheduler balances the load on the microengines comprising one or more threads allocated to execute a corresponding microblock. The scheduler determines the load on each microengine at regular time intervals. The scheduler balances the load of a heavily loaded microengine by distributing the corresponding load among one or more lightly loaded microengines.

22 Claims, 4 Drawing Sheets

BALANCING OF LOAD IN A NETWORK PROCESSOR

BACKGROUND

A computer network generally refers to a group of interconnected wired and/or wireless devices such as, for example, laptops, mobile phones, servers, fax machines, printers, etc. Computer networks often transfer data in the form of packets from one device to another device(s). An intermediate network device may consume processing cycles and such other computational resources while transferring packets.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes a system and a network device supporting load balancing. In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Figure 1:
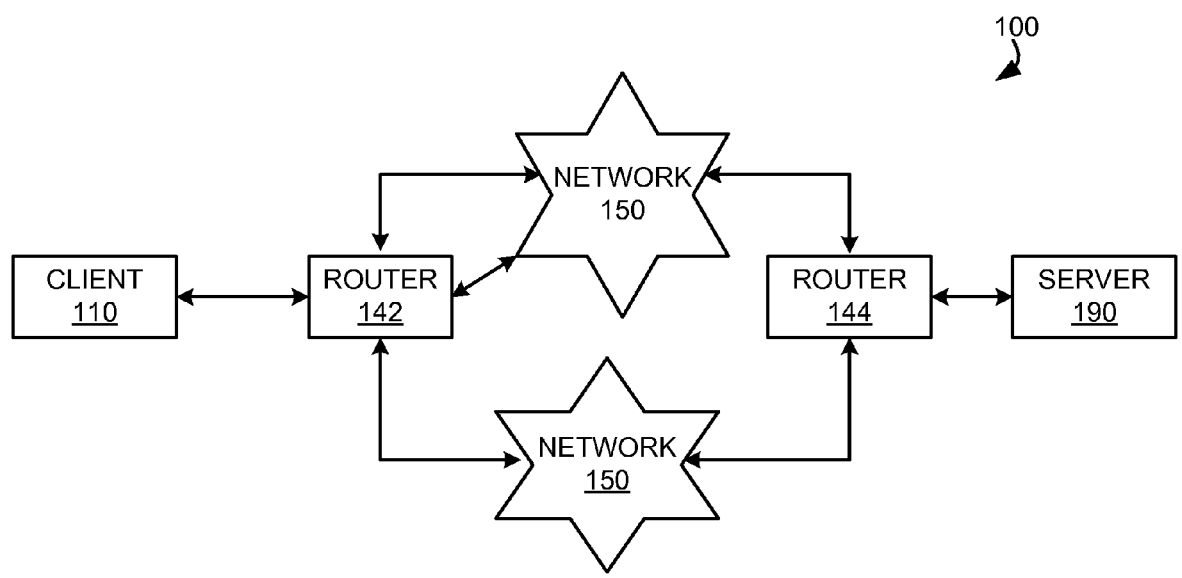
FIG. 1 illustrates an embodiment of a network environment.

An embodiment of a network environment 100 is illustrated in FIG. 1. The network environment 100 may comprise a client 110, a router 142 and a router 144, a network 150, and a server 190. For illustration, the network environment 100 is shown comprising a small number of each type of device; however, a typical network environment may comprise a large number of each type of device.

The client 110 may comprise a desktop computer system, a laptop computer system, a personal digital assistant, a mobile phone, or any such computing system. The client 110 may generate one or more packets and send the packets to the network 150. The client 110 may receive packets from the network 150 and process the packets before sending the packets to a corresponding application. The client 110 may be connected to an intermediate network device such as the router 142 via a local area network (LAN) to send and receive the packets. The client 110 may, for example, support protocols such as hyper text transfer protocol (HTTP), file transfer protocols (FTP), TCP/IP.

The server 190 may comprise a computer system capable of sending the packets to the network 150 and receiving the packets from the network 150. The server 190 may generate a response packet after receiving a request from the client 110. The server 190 may send the response packet corresponding to the client 110 via the routers 144 and 142 and the network 150. The server 190 may comprise, for example, a web server, a transaction server, a database server, and such other servers.

The network 150 may comprise one or more network devices such as a switch or a router, which may receive the packets, process the packets, and send the packets to an appropriate network device. The network 150 may enable transfer of packets between the client 110 and the server 190. The network devices of the network 150 may be configured to support various protocols such as TCP/IP.

The routers 142 and 144 may enable transfer of packets between the client 110 and the server 190 via the network 150. For example, the router 142 after receiving a packet from the client 110 may determine the next router provisioned in the path and may forward the packet to the next router in the path. Also, a packet received from the network 150 may be forwarded to the client 110. The router 142 may determine the next router based on the entries in the routing table. The entries may comprise one or more address prefixes and corresponding port identifiers.

Figure 2:
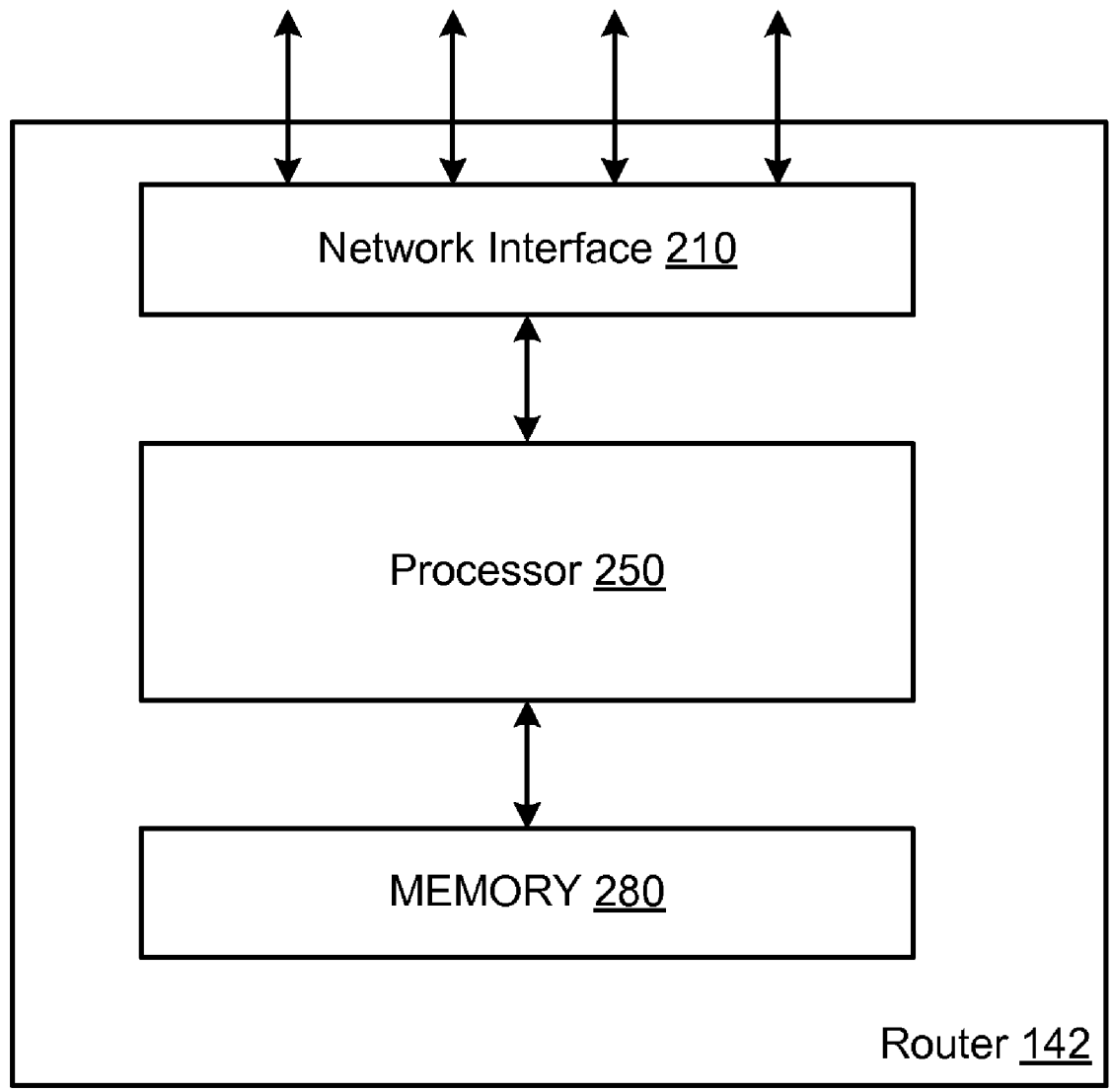
FIG. 2 illustrates an embodiment of a network device of FIG. 1

An embodiment of the router 142 is illustrated in FIG. 2. The router 142 may comprise a network interface 210, a processor 250, and a memory 280. The router 142 may receive one or more packets from client 110 and may determine, for example, the output ports on which the packets may be forwarded to the adjacent devices. However, several aspects of the present invention may be implemented in the router 144 or another intermediate network device of the network 150.

The network interface 210 may transfer one or more packets between the client 110 and the network 150. For example, the network interface 210 may receive the packets from the client 110 and send the packet to the processor 250 for further processing. The network interface 210 may provide physical, electrical, and protocol interfaces to transfer packets between the client 110 and the network 150.

The memory 280 may store one or more packets and packet related information that may be used by the processor 250 to process the packets. In one embodiment, the memory 280 may store packets, look-up tables, data structures that enable the processor 250 to process the packets. In one embodiment, the memory 280 may comprise a dynamic random access memory (DRAM) and a static random access memory (SRAM).

The processor 250 may receive one or more packets from the network interface 210, process the packets, and send the packets to the network interface 210. In one embodiment, the processor 250 may process the packets, for example, by performing header processing, packet validation, IP lookup, determining the output port and such other processing before sending the packet to the network interface 210. In one embodiment, the processor 250 may comprise, for example, Intel® IXP2400 network processor.

In one embodiment, the processor 250 may comprise one or more microengines to perform packet processing. Each microengine may comprise one or more threads and a group of threads may be assigned to perform a logical function referred to as a microblock. In one embodiment, the processor 250 may dynamically schedule the threads of a microengine to execute a microblock based on the load on each microengine at that time point. In one embodiment, the processor 250 may determine the load on each microengine based on the idle cycle count of each microengine.

However, the processor 250 may use busy cycle count and such other metrics to compute the load on each microengine. In one embodiment, the processor 250 may determine a metric indicating the utilization level of a set of threads based on either the idle cycle count or busy cycle count values. In one embodiment, the processor 250 may determine the available bandwidth of each microengine. The processor 250 may use the metrics such as idle cycle count or available bandwidth of each microengine before scheduling a thread of a microengine to execute a microblock.

As selection of a microengine and scheduling of threads may be based on a metric indicating the load of each microengine, the processor 250 may effectively utilize the processor resources to execute a selected microblock. In one embodiment, such an approach may cause the processor 250 to determine the appropriate output port quickly, minimize the packets that may be dropped due to overloading of microengines, and improve the performance of the processor 250 to process the packets at the line rate.

Figure 3:
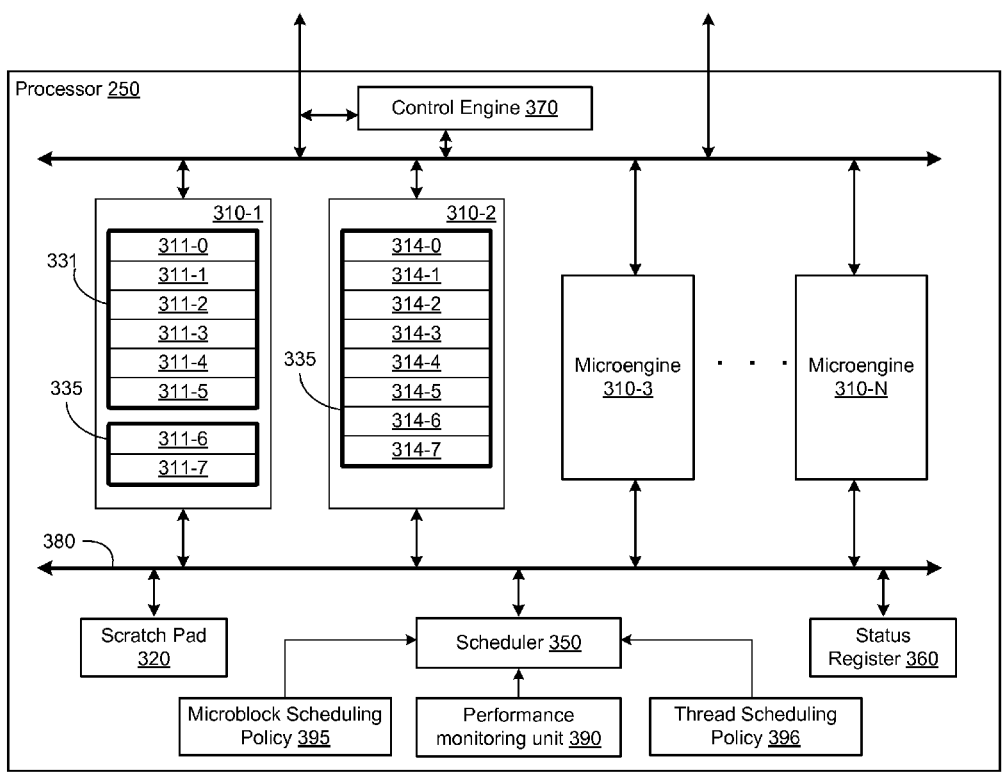
FIG. 3 illustrates an embodiment of a network processor of the network device of FIG. 2.

An embodiment of the processor 250 is illustrated in FIG. 3. The processor 250 may comprise microengines 310-1 through 310-N, a scratch pad 320, a scheduler 350, a status register 360, a control engine 370, a performance monitoring unit (PMU) 390, a microblock scheduling policy 395, and a thread scheduling policy 396.

The scratch pad 320 may store, for example, a buffer handler and such other data exchanged between two microengines corresponding to each packet in a pre-specified memory location. In one embodiment, the scratch pad 320 may store packet information corresponding to a packet Px, in a memory location Lxyz, wherein x represents the packet identifier, y represents the sinking microengine, and z represents the sourcing microengine. For example, a memory location L012 may store packet information corresponding to packet P0 sunk or written by the microengine 310-1 and sourced or read by the microengine 310-2.

The microengines 310-1 through 310-N may co-operatively operate to process the packets. Each microengine may process a portion of the packet processing task and may send the packet to the network interface 210. The processing of a packet may comprise sub-tasks such as packet validation, IP lookup, determining the type of service (TOS), validation of time to live (TTL), and determining next hop IP address/MAC address. In one embodiment, the packet processing on the microengines 310-1 through 310-N may be divided into one or more microblocks. The threads of the microengine 310-1 through 310-N may support one or more microblocks. In one embodiment, the microengines 310-1 through 310-N may comprise one or more threads and each thread may perform a sub-task of the assigned microblock.

In one embodiment, the processor 250 may comprise eight microengines and each microengine in turn may comprise eight threads. For example, the microengine 310-1 may comprise eight threads 311-0 to 311-7 and the microengine 310-2 may comprise eight threads 314-0 to 314-7. The threads 311-0 to 311-5 of the microengine 310-1 may be assigned to execute a microblock 331 and threads 314-0 to 314-7 of the microengine 310-2 may be assigned to execute a microblock 335. The microblock 331 may, for example, determine the type of the packets by inspecting the packet header and the microblock 335 may perform IP lookup.

In one embodiment, the thread 311-0 may receive a packet P0 and process the packet P0 to determine the type of packet. In the process, the thread 311-0 may initiate, for example, an I/O read operation. As the I/O read may take longer duration, the thread 311-0 may enter a wait state ('sleep' mode) during that period. While thread 311-0 is in wait state, the thread 311-1 may process a packet P1 and may then enter a wait state and the thread 311-2 may start processing a packet P2. However, the threads 311-0 and 311-1 may wake up and continue to respectively process the packets P0 and P1 after receiving a corresponding signal from the scheduler 350.

The microengines 310-1 through 310-N may use one or more pre-determined memory locations of the scratch pad 320 to source the information such as the packet meta-data to another microengine. The thread 311-0 of the microengine 310-1 may store the type of the packet P0 (e.g., IPV4) into a pre-determined memory location, for example, L012 of the scratch pad 320 after completing the sub-task.

A thread of the microengine 310-2 may read the data from the location L012 and perform the corresponding sub-task such as IP look-up to determine the output port for packet P0. The thread of the microengine 310-2 may store, for example, the output port of packet P0 into location L023 and the corresponding thread of the microengine 310-3 may read the data representing output port from the location L023 and send the packet P0 on the specified output port. In one embodiment, the packet meta-data may comprise data such as the length of the packet, type of the packet, an offset indicating the start bit identifying the payload, input port, output port, source address, destination address and such other data relevant for processing the packet.

In one embodiment, at time point TP1, the microengine 310-1 may consume M processor cycles to execute the microblock 331 and the threshold value for the microengine 310-1 may equal N (M<N). The actual processor cycles available to the microengine 310-1 may equal K, which may be more than N. As the microengine 310-1 is consuming M processor cycles that are less than the threshold value N, the microengine 310-1 may be referred to as being lightly loaded.

The microengine 310-2 supporting the microblock 335 may require X processor cycles to execute the microblock 335 and the threshold value of the microengine 310-2 may equal Y (X>Y). The actual processor cycles available to the microengine 310-2 may equal Z, which may be more than Y. As the microengine 310-2 is consuming X processor cycles that is more than the threshold value Y, the microengine 310-2 may be referred to as being heavily loaded. In one embodiment, such an imbalance in the loads on the microengines may be caused due to static allocation of microblocks to a group of threads of the microengines. In one embodiment, the threshold values N and Y may be adjusted such that the difference between the two thresholds may equal a specified value. In one embodiment, the specified value may indicate a minimum difference that may be used as a reference to determine whether a microengine is lightly loaded or heavily loaded.

The status register 360 may comprise one or more registers to store the status of the threads. For example, each thread 311-0 to 311-7 and 314-0 to 311-7 respectively of the microengines 310-1 and 310-2 may set or reset a pre-specified bit in the status register 360 to indicate the status of the corresponding thread. The thread 311-0 may store 0 in bit-zero of the status register 360 to indicate that the thread 311-0 is busy while determining the type of the packet P0. The thread 311-0 may store logic 1 in bit-zero after entering the sleep mode, which may indicate that the thread 311-0 is ready to process the corresponding packet.

The status register 360 may comprise a 64-bit register, for example, two 32 bit registers to support 64 threads of eight microengines. The bit-0 to bit-7 may respectively store the status of the eight threads of the microengine 310-1. Each thread of the microengine may update the status by setting or resetting the corresponding bit in the status register 360.

The performance monitoring unit (PMU) 390 may determine the load on each microengine and may store one or more values indicating the load on each microengine. For example, the PMU 390 may determine an idle cycle count corresponding to the microengine 310-1, which may indicate the load on the microengine 310-1. In one embodiment, the PMU 390 may determine the idle cycle count based on the status of each thread of the microengines 310-1 to 310-N. In one embodiment, the PMU 390 may comprise one or more adders, subtractors, and comparators to determine the idle cycle count. However, in other embodiments, the PMU 390 may compute busy cycle count and such other metrics that may indicate the load on the corresponding microengine.

In one embodiment, the PMU 390 may determine the idle cycle count on each microengine at pre-specified intervals. For example, the PMU 390, at time point TP1, may determine that the idle cycle count on the microengines 310-1 and 310-2 as equaling 200 MIPS and 10 MIPS respectively. The actual cycles available on the microengines 310-1 and 310-2 may equal 600 MIPS. However, at time point TP2, the PMU 390 may determine the idle cycle count on microengines 310-1 and 310-2 as respectively equaling 25 MIPS and 175 MIPS.

The control engine 370 may support the microengines 310-1 through 310-N by updating the control tables such as the look-up tables. In one embodiment, the control engine 370 may comprise, for example, Intel® XScale™ core. The control engine 370 may create one or more microblocks that process network packets. The control engine 370 may allocate the threads of the microengines for executing the microblocks.

In one embodiment, the control engine 370 may receive input values from a user and may initialize the data structures based on the user inputs. In one embodiment, the data structures may receive and maintain configuration information such as the number of microblocks that may be initialized in the processor 250. The data structures may specify the cluster of the microengines that may execute the microblock. For example, the microengines 310-1 through 310-N of the processor 250 may be divided into two clusters cluster-1 and cluster-2.

The data structures may specify the start thread and the end thread that may execute a microblock, the microengine that supports the allocated threads, and the cluster that comprises the microengine. For example, the control engine 370 may specify that threads 311-0 to 311-5 of the microengine 310-1 of a cluster may execute the microblock 331. The control engine 370 may allow the user to provide configuration data using interfaces such as an application programmable interface (API).

The scheduler 350 may schedule the threads of the microengine based on the load of on each microengine at a given time point. In one embodiment, the scheduler 350 may be implemented as a piece of hardware. In other embodiments, the scheduler 350 may be implemented as a set of instructions a group of threads may execute to implement the scheduler 350 as a microblock. In another embodiment, the scheduler 350 may be implemented via hardware of the control engine 370 and/or instructions executed by the control engine 370.

In one embodiment, the scheduler 350 may determine the microblock, the microengine and the threads to execute the microblock based on the values read from the PMU 390. In one embodiment, the threads 311-0 to 311-5 of the microengine 310-1 may execute the microblock 331. The threads 314-0 to 314-7 may execute the microblock 335. In one embodiment, the threads 311-6 and 311-7 of the microengine 310-1 may be dynamically assigned to execute the microblock 335 if the idle cycle count on the microengine 310-2 is less than a corresponding threshold value.

For example, the microblock 335 while processing IPV4 packets may consume processor cycles available on the threads 314-0 to 314-7. However, the microblock 335 may require additional processor cycles (i.e., additional threads) while processing IPV6 packets. The additional processor cycles required may be consumed by dynamically assigning at least a portion of the microblock 335 to the threads 311-6 and 311-7 of the microengine 310-1. As the scheduler 350 may schedule each thread of each microengine, the scheduler 350 may schedule any thread of any microengine to execute any microblock based on the load on each microengine at a given time point.

In one embodiment, the scheduler 350 may specify threshold levels of load for each microengine. For example, the microengines 310-1 and 310-2 may respectively have threshold values THV1 and THV2 and each threshold value may respectively equal 150 MIPS. At time point TP1 the scheduler 350 may read, for example, the idle cycle count of the microengine 310-1 and 310-2 as equaling 200 MIPS and 10 MIPS. The scheduler 350 may determine that the idle cycle count corresponding to the microengine 310-1 is more than the threshold value THV1 (=150) and the idle cycle count corresponding to the microengine 310-2 is less than the threshold value THV2 (=150). In other words, the microengine 310-1 is lightly loaded compared to the microengine 310-2, which is heavily loaded.

The scheduler 350 may select the microblock 335 and schedule one of the threads 314-0 to 314-7 and one of the threads 311-6 and 311-7 to respectively execute a portion of the microblock 335. As a result of dynamic allocation of the threads of the microengines to a microblock, the scheduler 350 may enable execution of two portions of the microblock 335 on the threads of the microengines 310-1 and 310-2 simultaneously. Thus, the scheduler 350, based on load balancing, may enhance the performance of the processor 250, for example, by increasing the throughput and/or decreasing the dropped packets.

The scheduler 350 may determine the load on each microengine at regular intervals or pre-specified time intervals. At time point TP1, the scheduler 350 may determine that the microengine 310-1 is lightly loaded and the microengine 310-2 is heavily loaded and may select microblock 335 for execution. However, at time point TP2, the scheduler 350 may select the microblock 331 if the microengine 310-1 heavily loaded as compared to the microengine 310-2, which may be lightly loaded.

In one embodiment, if the scheduler 350 selects two or more microblocks for execution, the scheduler 350 may choose one of the selected microblocks based on the microblock scheduling policy 395. In one embodiment, the microblock scheduling policy 395 may represent policies such as a round robin policy, or a priority based policy or any such policy to select a microblock. The scheduler 350 may select a thread based on the thread scheduling policy 396. In one embodiment, the thread scheduling policy 396 may represent policies such as a round robin policy, or a priority based policy or any such policy to select a thread. The scheduler 350 may select a microblock, select a thread, determine the status of the selected thread, determine the validity of the corresponding message, and schedule the selected thread to process the data. The scheduler 350 may send a signal if the thread is ready (or free) and if the valid message is available for the corresponding thread.

Such an approach of selecting the microblocks based on load balancing, choosing one of the selected microblocks and one of the selected threads respectively based on a corresponding scheduling policy may enable the processor 250 to efficiently utilize the processor resources.

Figure 4:
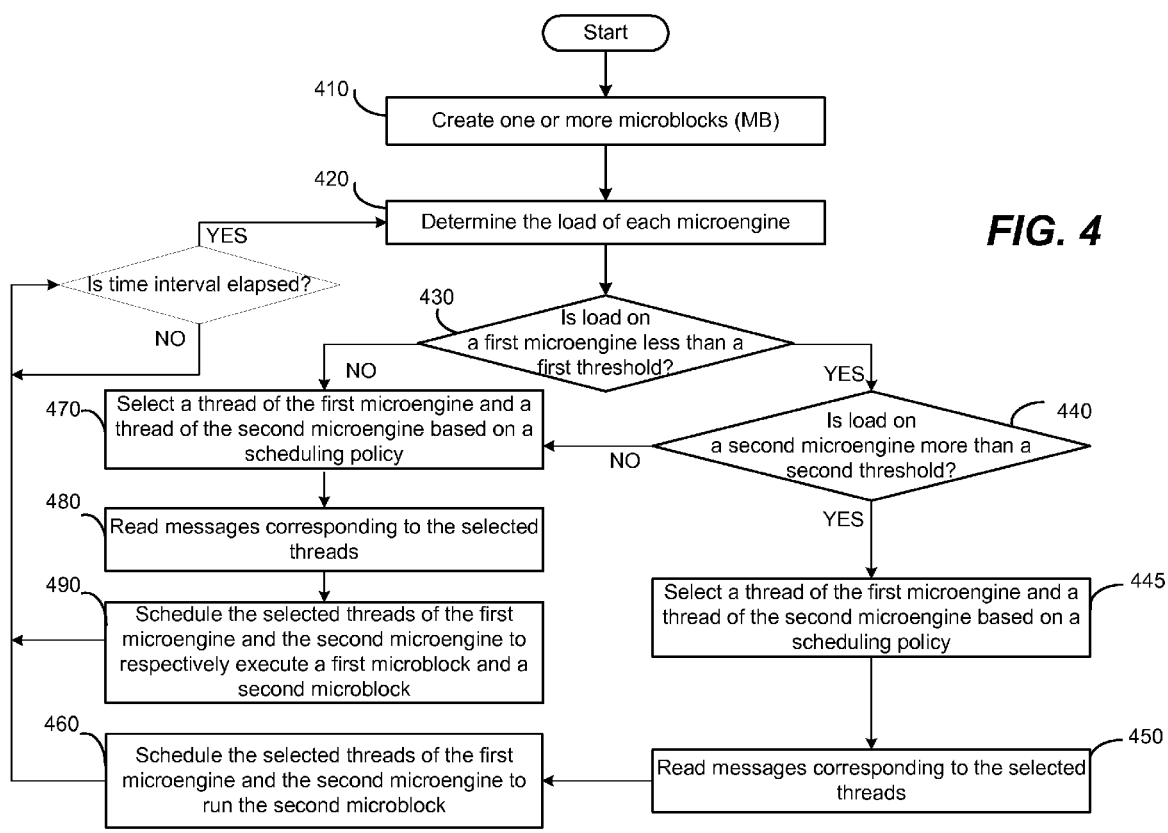
FIG. 4 illustrates the details of an operation of the network processor of FIG. 3.

An embodiment of the operation of the processor 250 scheduling a micro-block is illustrated in FIG. 4. In block 410, the control engine 370 may create one or more microblocks. The control engine 370 may create microblocks as described above. In block 420, the scheduler 350 may determine the load on each microengine. In one embodiment, the scheduler 350 may determine the load on each microengine after reading, from the PMU 390, the corresponding idle cycle count corresponding to each microengine.

In block 430, the scheduler 350 may determine whether the load of a first microengine configured to execute a first microblock and a portion of the second microblock is less than a first threshold. The scheduler 350 may cause control to reach block 440 if the condition is true and to block 470 otherwise. In one embodiment, the scheduler 350 may determine the load on the first microengine after reading the idle cycle count on the first microengine stored in the PMU 390.

In block 440, the scheduler 350 may determine whether the load of a second microengine configured to execute a portion of the second microblock is more than the second threshold. The scheduler 350 may cause control to reach block 445 if the condition is true and to block 470 otherwise. In one embodiment, the schedule 350 may determine the load on the second microengine after reading the idle cycle count on the second microengine stored in the PMU 390.

In block 445, the scheduler 350 may select a thread of the first microengine and a thread of the second microengine based on a scheduling policy such as a round robin policy. For example, the scheduler 350 may select a thread 314-0 and 311-7 respectively of the microengines 310-2 and 310-1 to execute a first and a second portion of the microblock 335.

In block 450, the scheduler 350 may read the message corresponding to the selected threads 314-0 and 311-7. The message may be read from the corresponding location of the scratch pad 320. The message may represent, for example, packet meta-data and such other valid data corresponding to the selected threads.

In block 460, the scheduler 350 may schedule the selected threads of the first microengine and the second microengine to execute a portion each of the second microblock. The scheduler 350 may schedule the threads 314-0 and 311-7 by sending a signal to the threads. The threads 314-0 and 311-7 may then execute corresponding portions of the microblock 335 based on the data read in block 445.

In block 470, the scheduler 350 may select a thread of the first microengine and a thread of the second microengine based on a scheduling policy such as a round robin policy. For example, the scheduler 350 may select the thread 311-0 of the microengine 310-1 and the thread 314-0 of the microengine 310-2 to respectively execute the microblock 331 and 335.

In block 480, the scheduler 350 may read the message corresponding to the selected threads 311-0 and 314-0. The message may represent packet meta-data and such other valid data corresponding to the selected threads.

In block 490, the scheduler 350 may schedule the selected threads of the first microengine and the second microengine to respectively execute the first and the second microblock. The scheduler 350 may schedule the threads 311-0 and 314-0 by sending a signal to the threads. The threads 311-0 and 314-0 may respectively execute the microblocks 331 and 335 based on the data read in block 470.

In block 495, the scheduler 350 may check whether the time interval is elapsed. The scheduler 350 causes control to reach block 420 if the time interval is elapsed and may otherwise wait in the loop until the time interval is elapsed. Thus, the scheduler 350 may balance the load among the microengines based on determining the load on each microengine and scheduling, for example, a portion of the microblock assigned to a heavily loaded microengine to be executed on a lightly assigned microblock.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A network processor to process network data, comprising:
   a plurality of microengines, wherein the plurality of microengines include a plurality of threads that process network data as a result of executing one or more microblocks,
   a performance monitoring unit to determine a first load indicator and a second load indicator corresponding to a first microengine and a second microengine at pre-specified time intervals, and
   a scheduler to,
   schedule a thread of the first microengine, allocated to execute a first microblock, to execute at least a portion of a second microblock, allocated to be executed on the second microengine, in response to determining that the first load indicator is less than the second load indicator by more than a specified value, retrieve the first load indicator and the second load indicator, wherein the first load indicator and the second load indicator respectively represent an idle cycle count of the first microengine and the second microengine, compare the first load indicator and the second load indicator respectively with the first threshold and the second threshold, and schedule the thread of the first microengine, allocated to execute the first microblock, to execute a portion of the second microblock if the idle cycle count of the first microengine is more than the first threshold and the idle cycle count of the second microengine is less than the second threshold.

2. The network processor of claim 1 further comprising a control engine to create the one or more microblocks and to allocate threads of the plurality of microengines for executing the one or more microblocks.

3. The network processor of claim 1 wherein the scheduler is executed on one or more threads of the plurality of microengines.

4. The network processor of claim 1 further comprises
a scratch pad to store messages for the threads of the plurality of microengines,
a status register to indicate whether each thread of the plurality of microengines is ready.

5. The network processor of claim 1 wherein the scheduler selects the thread in response to determining that a valid message is present, in the scratch pad, for the selected thread and the selected thread is free to execute the second microblock by checking the corresponding bit of the status register.

6. The network processor of claim 1 wherein the scheduler selects the thread of the first microengine to execute at least the portion of the second microblock based on a thread scheduling policy if more than one thread of the first microengine is free to execute the second microblock.

7. A method of processing network data in a network processor, comprising
processing network data with a plurality of microblocks executed by a plurality of threads,
determining a first bandwidth value and a second bandwidth value corresponding to a first microengine and a second microengine at pre-specified time intervals,
scheduling a thread of the first microengine, allocated to execute a first microblock, to execute at least a portion of a second microblock, allocated to be executed on the second microengine, in response to determining that the first bandwidth value is substantially more than the second bandwidth value,
determining the first bandwidth value and the second bandwidth value respectively based on the threads of the first microengine and the second microengine that are free,
comparing the first bandwidth value and the second bandwidth value, and
scheduling the thread of the first microengine, allocated to execute the first microblock, to execute a portion of the second microblock if the first bandwidth value of the first microengine is more than a first threshold and the second bandwidth value of the second microengine is less than a second threshold.

8. The method of claim 7 further comprising creating the one or more microblocks and allocating the threads of the plurality of set of threads for executing the plurality of microblocks.

9. The method of claim 7 further comprises
storing messages for threads of the plurality of set of threads, and
indicating whether each thread of the plurality of set of threads is ready.

10. The method of claim 7 wherein selecting the thread comprises determining whether a valid message is present for the selected thread and the selected thread is free to execute the second microblock.

11. The method of claim 7 wherein the thread of the first microengine is selected to execute at least the portion of the second microblock based on a thread scheduling policy if more than one thread of the first microengine is free to execute the second microblock.

12. A non-transitory machine-readable medium comprising a plurality of instructions that in response to being executed result in a network processor,
processing network data by executing a plurality of microblocks on a plurality of threads,
scheduling a thread of a first set of threads, allocated to execute a first microblock, to execute at least a portion of a second microblock, allocated to be executed on a second set of threads, in response to determining that a second utilization metric indicating the resources available in the second set of threads is less than a first utilization metric, which indicates the resources available in the first set of threads,
comparing an idle cycle count of the first set of threads and an idle cycle count of the second set of threads respectively with a first threshold and a second threshold, wherein the idle cycle count of the first set of threads represent the first utilization metric and the idle cycle count of the second set of threads represent the second utilization metric, and
scheduling a thread of the first set of threads, allocated to execute the first microblock, to execute at least a portion of the second microblock, allocated to be executed b the second set of threads if the idle cycle count of the first set of threads is more than the first threshold and the idle cycle count of the second set of threads is less than the second threshold.

13. The non-transitory machine-readable medium of claim 12 further comprising creating the plurality of microblocks that process network packets and allocating threads of the plurality of set of threads for executing the plurality of microblocks.

14. The non-transitory machine-readable medium of claim 12 further comprises,
retrieving messages for threads of the plurality of set of threads, and
indicating whether each thread of the plurality of set of threads is ready.

15. The non-transitory machine-readable medium of claim 12 wherein selecting the thread comprises determining whether a valid message is present for the selected thread and the selected thread is free to execute the second microblock.

16. The non-transitory machine-readable medium of claim 12 wherein the thread of the first set of threads is selected to execute at least the portion of the second microblock based on a thread scheduling policy if more than one thread of the first set of threads is free to execute the second microblock.

17. A network device comprising
a network interface to transfer network packets,
a memory to store packet data, and
a network processor to,
schedule a thread of a first set of threads, allocated to execute a first microblock, to execute a portion of a second microblock, allocated to be executed on a second set of threads, in response to determining that the first load indicator is less than the second load indicator by more than a specified value, retrieve the first load indicator and the second load indicator, wherein the first load indicator and the second load indicator respectively and idle cycle count of the first microengine and the second microengine, compare the first load indicator and the second load indicator respectively with the first threshold and the second threshold, and schedule the thread of the first microengine, allocated to execute the first microblock, to execute a portion of the second microblock if the idle cycle count of the first microengine is more than the first threshold and the idle cycle count of the second microengine is less than the second threshold.

18. The network device of claim 17, wherein the network processor computes the load on each set of threads at pre-specified intervals.

19. The network device of claim 17, wherein the network processor comprises a plurality of set of threads.

20. The network device of claim 17 the network processor comprises a plurality of clusters, wherein each duster comprises one or more of the plurality of set of threads.

21. The network device of claim 17, wherein the network processor updates a status associated with each thread of the plurality of threads to indicate whether each thread is busy.

22. The network device of claim 17, wherein the network processor determines whether a thread is ready based on the status of the thread.

* * * * *

UNITED STATES PATENT AND TRADEMARK OFFICE
CERTIFICATE OF CORRECTION

| | | |
|---|---|---|
| PATENT NO. | : 8,122,455 B2 | Page 1 of 1 |
| APPLICATION NO. | : 11/768353 | |
| DATED | : February 21, 2012 | |
| INVENTOR(S) | : Paul et al. | |

It is certified that error appears in the above-identified patent and that said Letters Patent is hereby corrected as shown below:

In the Claims

In column 10, at line 37 delete, "executed b" and insert --executed by--.

In column 11, at line 7 delete, "respectively and idle cycle count" and insert --respectively represent an idle cycle count--.

In column 12, at line 7 delete, "wherein each duster" and insert --wherein each cluster--.

Signed and Sealed this
Eleventh Day of November, 2014

Michelle K. Lee
*Deputy Director of the United States Patent and Trademark Office*